United States Patent [19]
Vacek

[11] 3,734,921
[45] May 22, 1973

[54] N-HALOQUINOLINIMIDES
[75] Inventor: Lubomir C. Vacek, Toledo, Ohio
[73] Assignee: The Sherwin Williams Company, Cleveland, Ohio
[22] Filed: Nov. 3, 1971
[21] Appl. No.: 195,449

Related U.S. Application Data

[63] Continuation-in-part of Ser. No. 840,508, July 9, 1969, abandoned.

[52] U.S. Cl....260/295.5 B, 260/244 A, 260/256.4 F, 260/295.5 A
[51] Int. Cl. .............................................C07d 39/00
[58] Field of Search ....................260/295.5 B, 244 A

[56] References Cited
UNITED STATES PATENTS 3,324,119   6/1967   Hill et al. ...........................260/244 A
3,622,573   11/1971  Schlaudecker ................260/295.5 A
3,687,951   8/1972   Hamburger et al. ..............260/244 A

*Primary Examiner*—Alan L. Rotman
*Attorney*—Carl F. Schaffer, Allen Owen and Henry K. Leonard et al.

[57] ABSTRACT

Method for producing isatoic anhydride and 3-azaisatoic anhydride which involves reacting, in an aqueous medium, an alkali or alkaline earth metal base and certain N-halophthalimides or N-haloquinolinimides at temperatures ranging from about 25° (all temperatures herein are in degrees Centigrade) down to the freezing point of the reaction mixture for a time sufficient to enable acidification of the reaction mixture to a pH in the range of about 5.5 to 7.0 within the aforedescribed temperature range without causing souring. After acidification, the reaction mixture is heated to a temperature where exothermic reaction begins and reaction is allowed to proceed while the pH of the reaction mixture is maintained in the range of about 5.5 to 7 until reaction is complete.

2 Claims, No Drawings

N-HALOQUINOLINIMIDES

This is a continuation-in-part of Ser. No. 840,508, filed July 9, 1969, now abandoned.

BACKGROUND OF THE INVENTION

1. Field of the Invention

In recent years considerable interest in isatoic anhydride has developed because of the facility with which it and its ring substituted analogues can be used as intermediates in the production of pharmaceuticals, (U.S. Pat. No. 3,170,955 (1965); U.S. Pat. No. 3,162,684 (1964); U.S. Pat. No. 3,163,646 (1964); U.S. Pat. No. 3,120,523 (1964); Neth Apl. 6,407,857 (1965); U.S. Pat. No. 3,252,986 (1966); U.S. Pat. No. 3,274,194 (1966)) agricultural chemicals, (British 894,435 (1962); British 865,735 (1961); U.S. Pat. No. 3,244,503 (1966); Germany 1,210,242 (1966)) perfume essences and anthranilic acid esters which are used as flavoring materials.

Such interest has stimulated a search for new, less expensive and non-hazardous methods of production of isatoic anhydride and its substituted analogues.

Interest in 3-azaisatoic anhydride is also strong since it has been found that it too is useful in the production of pharmaceuticals and agricultural chemicals, as herein described in more detail.

2. Description of the Prior Art

Isatoic anhydride has heretofore been produced commercially in Germany by reaction between anthranilic acid and phosgene ($COCl_2$), a highly toxic material.

Isatoic anhydride can also be produced from phthalimide, sodium hydroxide, bleach and acid. The method is described in U.S. Pat. No. 3,324,119, Hill et al.

A method for the preparation of 3-azaisatoic anhydride is described in U.S. patent application Ser. Nos. 510,034 and 663,199. The essence of the invention disclosed therein comprises reacting, in an aqueous solution and at a temperature below 40° C., quinolinimide, a substantially equimolecular proportion of sodium hydroxide, and about one mole of sodium hypochlorite per mole of quinolinimide, and subsequently adjusting the pH to a predetermined level.

The above described method is a perfectly satisfactory means of making 3-azaisatoic anhydride; however, alternate routes are still being sought.

It is an object of the present invention to provide a new method whereby isatoic anhydride and 3-azaisatoic anhydride can be produced in consistent high yields and purity.

It is a further object to provide a method for the production of isatoic anhydride and 3-azaisatoic anhydride which is non-hazardous and simple to follow, and which does not require exotic or expensive starting materials or complicated apparatus.

BRIEF SUMMARY OF THE INVENTION

The method of the invention comprises reacting in an aqueous medium with agitation an imide having the formula

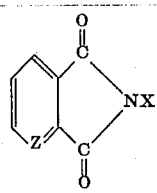

wherein X is Cl or Br, and Z is N or CH, with from about 2.0 to 3 equivalents of an alkali or alkaline earth metal base per mole of the imide. The reaction is initially conducted at a temperature in the range of about 25° down to the freezing point of the reaction mixture for a time sufficient to enable subsequent acidification of the reaction mixture while at those temperatures to a pH in the range of about 5.5 to 7 without causing souring. (Souring is the name for a phenomenon which involves an uncontrolled reaction whereby the pH drops spontaneously to 3 or 4 and the reaction mixture foams and gives off a noxious gas thought to be chloramine.) Thereafter, the reaction mixture is acidified to a pH in the range of about 5.5 to 7 and is then heated to a temperature, usually 30° to 40°, where exothermic reaction proceeds rapidly. During the exothermic reaction, the pH is maintained within the range of about 5.5 to 7 until the reaction is complete as evidenced by decrease of the exotherm. The crystals of isatoic anhydride, or 3-azaisatoic anhydride are then recovered by filtration, washed, and dried.

In the above formula, when Z is CH, the compound is called an N-halophthalimide; when Z is nitrogen, the compound is called an N-haloquinolinimide.

Examples of N-halophthalimides which can be used in the process of this invention include N-chlorophthalimide and N-bromophthalimide.

The N-halophthalimide used in the method of the invention can be produced by several different methods. For example, one method involves introducing $Cl_2$ or $Br_2$ into a caustic solution of commercially available phthalimide. Another method involves introducing $Cl_2$ or $Br_2$ into a water dispersion of phthalimide. In both methods it is important to add sufficient chlorine or bromine for complete reaction with the phthalimide. Furthermore, the best results are achieved using phthalimide having a particle size of 60 mesh or smaller. After conversion of the phthalimide to an N-halophthalimide, the product is recovered by filtration, washed with water and air dried at room temperature. The latter method was used to produce N-chlorophthalimide in 98 percent crude yield of 96 percent assay, based on the phthalimide.

Examples of N-haloquinolinimides which can be used in the process of this invention are N-chloroquinolinimide and N-bromoquinolinimide.

The N-haloquinolinimide used in the method of the invention can be produced by the same techniques used to produce the N-halophthalimide, i.e., by introducing $Cl_2$ or $Br_2$ into a caustic solution of quinolinimide, or by introducing $Cl_2$ or $Br_2$ into a water dispersion of quinolinimide.

After conversion of the quinolinimide to an N-haloquinolinimide, the product is recovered by filtration, washed with water and air dried at room temperature. The latter method was used to produce N-chloroquinolinimide in 91 percent crude yield, based on the quinolinimide.

Absolute purity of the N-haloquinolinimide is not necessary, but it is important to assay the material to enable accurate control of metal base to N-haloquinolinimide mole ratios.

Example A below illustrates the production of N-chloroquinolinimide.

EXAMPLE A

PREPARATION OF N-CHLOROQUINOLINIMIDE

A 3 l. resin kettle equipped with a thermometer, stirrer, and gas disperser tube connected to a $Cl_2$ cylinder through a suitable rotameter, was charged with 1,000 ml. $H_2O$ and brought to about 10° with an ice-water bath. When the temperature reached 10° the addition of $Cl_2$ at a rate of 0.24 gm. $Cl_2$/min. was begun followed by portionwise addition of 74.1 gm. quinolinimide (molecular weight 148.2) previously ground and screened through a 100 mesh sieve. The addition of quinolinimide continued for about 2½ hours. The temperature was maintained at 5°-10° throughout the addition. The addition of $Cl_2$ was stopped when 45 gm. $Cl_2$ (molecular weight 70.92) had been added. The addition of $Cl_2$ took 187 minutes. The cold slurry was stirred for 1½ hours, then filtered, and the solids were washed with cold $H_2O$.

The filtered solids, after air drying, amounted to 82.9 gms. tan or sand colored material, melting point 185°-188°. This represented a crude yield of 91 percent.

The material was subjected to elemental analysis with the following results:

| Element | Theory | Found |
| --- | --- | --- |
| Carbon | 46.05% | 46.67% |
| Hydrogen | 1.65% | 1.58% |
| Nitrogen | 15.32% | 15.52% |

The structure was verified by infrared spectroscopy and by determination of chlorine content by hydrolysis and combustion (19.72 and 19.63 percent respectively: theory 19.42 percent).

N-bromoquinolinimide can be produced by the procedure of Example A by substituting an equivalent amount of bromine for the chlorine used in the Example.

The term alkali or alkaline earth metal base as used above to identify one of the starting materials used in practicing the instant invention to produce isatoic anhydride or 3-azaisatoic anhydride refers to an alkali metal or alkaline earth metal hydroxide. The preferred metal base for use in this invention, for economic reasons only, is NaOH. Other metal bases which are less preferred but equally suitable include the hydroxides of all metals of groups IA and IIA of the periodic table which are practically available. The hydroxides of K, Mg, Ca and Ba are the most likely substitutes for NaOH.

The amount of metal base which can be employed in the method of this invention ranges from about 2.0 to about 3 equivalents, based on the N-halophthalimide or N-haloquinolinimide. The best yields, however, are achieved with about 2–2.4 equivalents of metal base, based on the imide. Ratios of less than 2.0 to 1 are operable, but result in significantly lower yields.

Water is the preferred solvent medium for the reaction because of its low cost. Other solvents can be used alone or mixed with water if they do not either react in such a way as to interfere with the course of the reaction or react with the final product. The main function of the water is to solvate the materials and to act as a heat absorption medium. The exact amount is not critical but best results have been achieved with solutions containing at least about 0.64 mole of the N-halophthalimide or N-haloquinolinimide per liter of water. The use of more dilute solutions will result in some reduction in yield.

After the mixing together of the reactants at temperatures ranging from bout 25° to the freezing point in an aqueous medium, the mixture is maintained within this temperature range for a period of time designated as the stabilization period. It is believed that during the stabilization period all of the N-halophthalimide or N-haloquinolinimide is converted to the dianion of the corresponding acid:

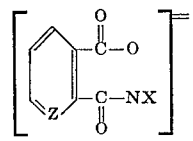

The length of the stabilization period is variable, usually not more than about 25 minutes and sometimes being substantially instantaneous. At the end of the stabilization period the reaction mixture can be acidified to a pH in the range of about 5.5 to 7 at temperatures in the range of about 15° down to the freezing point of the mixture without the occurrence of souring. As the acidification temperature approaches 15°, the percentage yield obtained decreases. If souring of an entire batch should occur, the uncontrolled reaction should be stopped by immediately adding excess caustic, for, if allowed to proceed uncontrolled, the souring reaction may possibly result in an explosion. Souring appears to be favored by temperatures about 25°, particularly during the stabilization period, by pH below about 5.5, by an insufficiency of the metal base and by acidification before the end of the stabilization period. The optimum stabilization period must be determined empirically for any given set of conditions. This can be accomplished by periodic acidification of small samples of the reaction mixture; the batch can be acidified without souring as soon as a sample can be so acidified. Generally, however, the end of the stabilization period is marked by a positive starch-iodide test. The overall reaction can be illustrated schematically as follows, the preparation of 3-azaisatoic anhydride being illustrated.

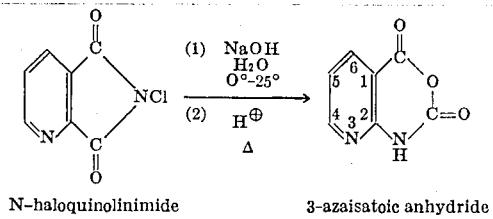

N-haloquinolinimide      3-azaisatoic anhydride

The reaction mixture should be acidified while it is maintained at temperatures between about 15° and the freezing temperature of the mixture. The pH should be adjusted to one in the range of about 5.5 to 7, and most preferably to pH 6.4 to 6.7. In no case should the pH be permitted to go below about 5.5 since the chances for souring of the reaction increase as the pH approaches 5. A pH higher than about 7 is undesirable since high pH favors hydrolysis of the anhydrides and the formation of condensates of the desired product.

The identity of the acid which is used for acidification is not critical. Any acid can be used which is capable of lowering the pH of the reaction mixture and which does not interfere with the course of the reaction to produce the desired anhydride. Mineral acids are preferred over organic acids for their low cost and availability. Sulfuric acid and hydrochloric acid are most preferred for the above stated reason.

The exact concentration of acid is not important. As a practical matter, some dilution of the acid is desirable for good temperature control. When sulfuric and hydrochloric acids are used it has been found that 5 normal concentration enabled good temperature control.

When acidification is complete the reaction mixture is heated, preferably rapidly, to a temperature in the range of 30°–40°, at which time exothermic reaction begins. The heat source is removed at this point and exothermic reaction is allowed to proceed freely. The pH, however, is desirably kept within the range of about 5.5 to 7 by charging of additional acid. The pH will otherwise increase to a high of about 9 and reduce the yield of isatoic anhydride or 3-azaisatoic anhydride. The extent of the temperature rise is usually in the neighborhood of about 15°, but may be somewhat higher or lower depending upon the temperature to which the batch is heated and the amount of water present. Slightly higher yields are obtained when heating is rapid, as in about 2–3 minutes, rather than in longer periods. When the reaction is complete, the exotherm ceases. At this point the pH should be readjusted, if necessary, to one from about 5.5 to 7, and preferably to one from 6.0–6.4.

The crystals of isatoic anhydride or 3-azaisatoic anhydride are then recovered by filtration, washed several times with water and dried, for example, at about 60° or, if preferred, air dried at room temperature.

PREFERRED EMBODIMENTS

The following examples are presented to aid those skilled in the art in understanding and practicing this invention, and represent preferred embodiments thereof.

EXAMPLE I

PREPARATION OF ISATOIC ANHYDRIDE FROM N-CHLOROPHTHALIMIDE

A 250 ml. beaker equipped with a thermometer and stirrer was charged with 100 ml. tap water and 18.76 gm. N-chlorophthalimide (molecular weight 181.58). The resulting slurry was stirred for 10 minutes during which time it was immersed in a dry ice-acetone bath and cooled to 1°. An addition of 16.56 gm. caustic solution (48.67 percent NaOH content by weight) was then made followed by an addition of 50 ml. tap water. The temperature of the reaction mixture rose to 4° in 30 seconds. Further increase was prevented, however, and the reaction mixture was cooled to 0°. The reaction mixture was stirred for 16 minutes after the caustic addition, during which time the temperature was maintained between 0° and −3°. The amount of solids decreased in the first 5 minutes, resulting in a colorless solution with a few white solids. The reaction mixture gave an increasingly intense and rapidly developing blue color with starch-iodide paper. After the 16 minutes stirring, the pH of the reaction mixture was brought to 6.3—6.4 by the addition, over a 5 minute period, of 9.05 ml. concentrated HCl. The acidification was accompanied by the appearance of purple solids and an intense purple color in the solution, and the reaction mixture gave an intense, immediate blue color with starch-iodide paper. At this point the cooling bath was replaced by a hot water bath, and the temperature of the reaction mixture was raised to 40° C. over a period of 2 ½ minutes, at which time the heating bath was removed. The temperature rise was accompanied by the appearance of more solids, along with a decrease of pH to 5.5–5.6. The temperature of the reaction mixture continued to increase after the removal of the heat source, reaching 48 ½° in 1 ½ minutes. The temperature increase after the heating bath was removed was accompanied by rapid disappearance of purple color in the reaction mixture and rise of pH to 6.1. When the starch-iodide test became negative, the pH of the reaction mixture was adjusted to 5.4 with 0.35 ml. concentrated HCl. The reaction mixture was cooled to 20° C., and solids were removed therefrom by filtration. The filtered material was washed with small amounts of cold water and dried.

The dried solids were tan in color and weighed 15.91 gm. (representing a crude yield of 97.54 percent) and had a melting point of 228°–232° C. The solids were subjected to an assay which revealed the product to be 93.6 percent isatoic anhydride. The overall yield was 91.2 percent based on N-chlorophthalimide.

EXAMPLE II

Several additional runs are summarized in Table II below. The methods of preparation of the various samples were substantially the same as set forth in Example 1, the basic difference being in the ratio of NaOH to N-halophthalimide used.

| sample No. | mole ratio (a) NaOH/NCIP | Order | $t_o$ (d) OH-NCIP | t (e) Max | Acid (f) Added (ml.) | pH after [h] temperature rise | pH after acidification stopped | pH at time product filtered | Normality [i] | M.p. | Assay | Percent [j] yield |
|---|---|---|---|---|---|---|---|---|---|---|---|---|
| 1 | 2.11 | F [b] | −1° | 45° | | 6.3–6.4 | 7.8 | 6.7 | 6.2–6.3 | 0.32 | 233–234 | 97.4 | 84.2 |
| 2 | 2.09 | F | 0° | 47° | 4.15 | 6.0–6.1 | 7.2 | 6.7–7.8 | 6.0 | 0.32 | 233–234 | 96.3 | 89.8 |
| 3 | 2.09 | F | 1° | 47.5° | 4.40 | 5.6–5.7 | 6.5–6.6 | 6.4–6.5 | 5.6–5.7 | 0.32 | 234–235 | 94.9 | 89.7 |
| 4 | 2.03 | F | 1° | 48.5° | 8.55 | 5.5–5.6 | 6.1 | 6.3–6.4 | 5.4 | 0.64 | 228–232 | 93.8 | 91.2 |
| 5 | 4.98 | F | 1° | 46° | 4.30 | 5.9–5.1 | 8.1–8.2 | 6.5–6.6 | 6.1–6.2 | 0.32 | 232–235 | 93.0 | 88.4 |
| 6 | 2.20 | F | 1° | 45.8° | 5.59 | 5.8–5.9 | 8.3–8.4 | 6.4–6.5 | 6.3 | 0.32 | 227–230 | 95.4 | 78.2 |
| 7 | 2.07 | R [c] | −4° | 49° | 4.40 | 5.5–5.6 | 5.3–5.4 | 6.4–6.5 | 5.3–5.4 | 0.32 | 200–233 | 89.7 | 78.9 |
| 8 | 2.00 | F | 0° | 43.2° | 4.00 | 5.4–5.5 | 6.7–6.8 | 6.4 | 6.7–6.8 | 0.32 | 226–232 | 91.5 | 85.5 |
| 9 | 2.00 | R | −1.5° | 44.5° | 3.95 | 5.4–5.5 | (k) | 6.5–6.6 | 6.1–6.2 | 0.32 | 226–231 | 88.5 | 79.7 |
| 10 | 2.00 | R | −3.5° | 47° | 4.00 | 5.7–5.8 | 7.5 | 6.6 | 6.1 | 0.32 | 226–233 | 92.3 | 87.6 |
| 11 | 2.00 | F | 1° | 47.5° | 4.00 | 5.7–5.8 | 7.1 | 6.6 | 6.5 | 0.32 | 223–230 | 93.0 | 86.4 |
| 12 | 2.00 | F | 18° | 41° | 3.27 | 6.2–6.3 | 7.4–7.5 | 6.5–6.6 | 6.4 | 0.32 | 216–235 | 89.2 | 71.9 |
| 13 | 2.03 | R | −4° | 48.5° | 5.26 | | | | | | | | |
| 14 | 2.08 | R | −1° | 55° | 5.42 | | | | | | | | |
| 15 | 2.37 | R | −2° | 56° | 6.80 | | | | | | | | |
| 16 | 1.00 | R | −3° | 44.5° | none | | | | | | | | |

| Lowest pH g | pH after h temperature rise | pH after acidification stopped | pH at time product filtered | Normality i | M.p. | Assay | Percent yield j |
|---|---|---|---|---|---|---|---|
| 5.8–5.9 | 8.3–8.4 | 6.6–6.7 | 6.6 | 0.64 | 227–231 | 93.6 | 88.4 |
| 5.8–5.9 | 8.4–8.5 | 6.6 | 6.5–6.6 | 0.64 | 227–230 | 94.0 | 89.0 |
| 6.0–6.1 | 8.8 | 6.5–6.6 | 6.3 | 0.64 | 225–228 | 93.9 | 87.6 |
| 6.8–6.9 | (k) | 6.8–6.9 | 7.3 | 0.48 | 188–216 | 53.7 | 44.0 |

Legend:
a NClP stands for N-chlorophthalimide.
b F means that the caustic was added to the slurry of N-chlorophthalimide in water.
c R means that the N-chlorophthalimide was added to the caustic solution.
d $T_o$ refers to temperature of reaction mixture at time reaction began.
e $T_{max}$ refers to the maximum temperature reached during the course of the reaction.
f Refers to total amount of concentrated HCl (ml.) added during entire reaction.
g Refers to lowest pH reached during the course of the reaction.
h Refers to pH of reaction mixture at point when temperature was highest.
i Refers to normality of reaction mixture at final volume.
j Based on N-chlorophthalimide.
k Not observed.

EXAMPLE III

PREPARATION OF 3-AZAISATOIC ANHYDRIDE FROM N-CHLOROQUINOLINIMIDE

A 400 ml. beaker equipped with a thermometer and stirrer was charged with 160 ml. cold $H_2O$ and 9.10 gm. N-chloroquinolinimide (molecular weight 182.58). The resulting slurry was cooled to 1° with a dry ice-acetone bath and 16.38 ml. 6.03N NaOH was charged rapidly. The temperature of the batch rose to 8°; the pH of the batch was 13.1. Rapid cooling with the dry ice-acetone bath brought the temperature down to −1° in 1 minute. At this point all N-chloroquinolinimide was dissolved and the pH of the solution was 12.7. The solution gave a strong, positive starch-iodide test. Based on this test, the addition of concentrated HCl was commenced. In 3 minutes 1.80 ml. concentrated HCl was added. When the pH of the solution was 6.2–6.3 acidification was stopped and rapid heating of the batch with a hot water bath was begun. After 8 minutes the temperature of the batch was 32° C. and the pH was 6.0–6.1. Small amounts of precipitate were observed, and the color of the solution darkened considerably. During the next 7 minutes the temperature was raised to 45° C. (pH= 6.1–6.2) and then the batch was cooled to 25° and filtered. The solids were washed with cold $H_2O$ and air dried at 60° C. for 25 hours.

The dried solids were tan in color, weighed 2.08 gm., melted with decomposition at 207.0°–207.5° and were identified by infrared spectroscopy as 3-azaisatoic anhydride. The crude yield was 25.3 percent.

EXAMPLE IV

PREPARATION OF ISATOIC ANHYDRIDE FROM N-CHLOROPHTHALIMIDE

A 250 ml. beaker equipped with a thermometer and stirrer was charged with 100 ml. tap water and 9.05 gm. N-chlorophthalimide (molecular weight 181.58). The resulting slurry was stirred for 10 minutes during which time it was immersed in a dry ice-acetone bath and cooled to 15°. An addition of 8.28 gm. caustic solution (48.67 percent NaOH content by weight) was then made followed by an addition of 50 ml. tap water. The reaction mixture was stirred for 2.5 minutes after the caustic addition, during which time the temperature was maintained at 15°. The reaction mixture gave an increasingly intense and rapidly developing blue color with starch-iodide paper. After the 2.5 minute stirring, the pH of the reaction mixture was brought to 7.2 by the addition, over a 6 minute period, of concentrated HCl, maintaining the temperature at 5°. The acidification was accompanied by the appearance of solids and an intense purple color in the solution, and the reaction mixture gave in intense, immediate blue color with starch-iodide paper. At this point the cooling bath was replaced by a hot water bath, and the temperature of the reaction mixture was raised to 40° C. over a period of 2 ½ minutes, at which time the heating bath was removed. The temperature rise was accompanied by the appearance of more solids, along with a decrease of pH. The temperature of the reaction mixture continued to increase after the removal of the heat source, reaching about 55° in 1 ½ minutes. The temperature increase after the heating bath was removed was accompanied by rapid disappearance of purple color in the reaction mixture and rise of pH. When the starch-iodide test became negative, the pH of the reaction mixture was adjusted to 5.4 with concentrated HCl. The reaction mixture was cooled to 20° C., stirred for 1 minute, and solids were removed therefrom by filtration. The filtered material was washed with small amounts of cold water and dried.

The dried solids were tan in color. The overall yield was 85.9 percent based on N-chlorophthalimide.

EXAMPLE V

Several additional runs are summarized in Table III below. The methods of preparation of the various samples were substantially the same as set forth in Example IV, except that both the NaOH/N-halophthalimide ratio, and the time-temperature of the initial reaction and the acidification reaction were varied.

TABLE III

| Sample No. | Mole Ratio NaOH/NCLP | NaOH time | temp. | Acidification Time | Temp. | Percent Yield |
|---|---|---|---|---|---|---|
| 1 | 2.0:1 | 7 | 5° | 6 | 5° | 68.9 |
| 2 | 2.0:1 | 11 | 5° | 6 | 5° | 91.5 |
| 3 | 2.0:1 | 3 | 10° | 6 | 5° | 88.8 |
| 4 | 2.0:1 | 7 | 10° | 6 | 5° | 89.6 |
| 5 | 2.0:1 | 2.5 | 15° | 6 | 5° | 85.9 |
| 6 | 2.0:1 | 6.5 | 15° | 6 | 5° | 86.0 |
| 7 | 2.0:1 | 1.0 | 25° | 6 | 5° | 79.9 |
| 8 | 2.0:1 | 5.0 | 25° | 6 | 5° | 72.7 |
| 9 | 2.2:1 | 4 | 5° | 6 | 5° | 90.6 |
| 10 | 2.2:1 | 6 | 5° | 6 | 5° | 91.3 |
| 11 | 2.2:1 | 3 | 10° | 6 | 5° | 87.8 |
| 12 | 2.2:1 | 4 | 10° | 6 | 5° | 89.0 |
| 13 | 2.2:1 | 1.0 | 25° | 6 | 5° | 81.0 |
| 14 | 2.2:1 | 1.5 | 25° | 6 | 5° | 75.7 |
| 15 | 2.4:1 | 2.0 | 5° | 6 | 5° | 91.1 |
| 16 | 2.4:1 | 3.0 | 5° | 6 | 520 | 89.5 |
| 17 | 2.4:1 | 4.0 | 5° | 6 | 5° | 91.7 |
| 18 | 2.4:1 | 2.0 | 10° | 6 | 5° | 90.2 |
| 19 | 2.4:1 | 3.0 | 10° | 6 | 5° | 87.8 |
| 20 | 2.4:1 | 4.0 | 10° | 6 | 5° | 88.9 |
| 21 | 3.0:1 | 2.0 | 5° | 6 | 5° | 88.7 |
| > | 3.0:1 | 6.0 | 5° | 6 | 5° | 85.4 |

Table III—Continued

| | | | | | | |
|---|---|---|---|---|---|---|
| 23 | 3.0:1 | 12.0 | 5° | 6 | 5° | 84.0 |
| 24 | 3.0:1 | 2.0 | 10° | 6 | 5° | 88.0 |
| 25 | 3.0:1 | 6.0 | 10° | 6 | 5° | 77.9 |
| 26 | 3.0:1 | 0.5 | 20° | 6 | 5° | 84.8 |
| 27 | 1.0:2.2 | 15.0 | 0.0 | 6 | 5° | 90.0 |
| 28 | 1.0:2.2 | 15.0 | 0.0 | 6 | 10° | 87.7 |
| 29 | 1.0:2.2 | 15.0 | 0.0 | 6 | 15° | 83.2 |

The manner of addition of the reactants is not important; yields were substantially the same when the metal base was added to the N-halophthalimide as for the reverse procedure. Stirring of the reactants throughout the process is very important to avoid high local concentrations of reactants and to obtain good temperature control.

The temperature at which the reactants are mixed is important. Temperatures of between 25° down to the freezing point of the reaction mixture are essential for high yields. The data contained in Table III indicates that at a given NaOH/NCLP molar ratio, the reaction time varies inversely as a function of the reaction temperature. This may be easily discerned, for example, from the reactions involving a NaOH/NCLP molar ratio of 3.0:1. At a temperature of 5° and a reaction time of 6 minutes, an 85.4 percent yield of isatoic anhydride was obtained. When the temperature was raised to 10° at the same reaction time, a yield of 77.9 percent was obtained. However, when the temperature of 10° was used in conjunction with a shorter reaction time of 2 minutes, a yield of 88 percent was obtained. At a reaction temperature of 20°, a reaction time of 0.5 minute produced a yield of 84.8 percent. The aforediscussed time-temperature relationships indicate that for each reaction temperature, there is an optimum reaction time. The optimum reaction time generally varies inversely as a function of the reaction temperature. Since the reaction which takes place between the metal base and the N-halophthalimide is exothermic, it may be necessary to cool aqueous solutions of these reactants prior to mixing. If it is desired to conduct the reaction at a low temperature for a longer reaction time, the low temperature can be obtained easily by using methanol in dry ice to surround the reaction vessel.

The 3-azaisatoic anhydride produced by the method of this invention can in turn be used in the production of 2-amino-N-substituted nicotinamides and 3-substituted pyrido [2,3-d]pyrimidine-2,4(1H,3H)-diones, compounds known to be effective in controlling weeds. For example, 3-isopropyl pyrido[2,3-d]pyrimidine-2,4(1H,3H)-dione can be dissolved in acetone and sprayed onto soil which has been prepared for planting. A light working of the soil after spray application is desirable, e.g. by dragging or discing to work the 3-isopropyl pyrido[2,3-d]pyrimidine-2,4(1H,3H)-dione into the soil. The soil can then be planted in a conventional manner. The 3-isopropyl pyrido[2,3-d] pyrimidine-2,4(1H,3H)-dione, applied at a rate of 16 pounds per acre, is innocuous to alfalfa, but shows herbicidal activity against volunteer corn, wild oats, cheatgrass, foxtail, barnyard, crabgrass, nutgrass, Johnsongrass, volunteer snapbeans, soybeans, pigweed, lambsquarter and marigold and, at higher application rates, can be used as a total vegetation control agent.

It has also been found that the 2-amino-N-substituted nicotinamides are useful as herbicides. For example, 2-amino-N-isopropylnicotinamide can be dissolved in acetone and used as described in the preceding paragraph hereof at an application rate of 16 pounds per acre as a preemergence herbicide for the control of wild oats.

N-chloroquinolinimide and N-bromoquinolinimide are useful as aquatic herbicides. For example, N-chloroquinolinimide has been found to provide, at a concentration of 10 parts per million of water, by weight, total kill of salvinia and elodea.

The production of these compounds is described below:

PREPARATION OF 2-AMINO-N-ISOPROPYLNICOTINAMIDE

A 250 ml. 3-neck flask was charged with 8.2 g. 3-azaisatoic anhydride dissolved in 25 ml. dimethylformamide, and the solution was heated to a temperature in the range of 30° to 35°, with stirring. A solution of 4 g. isopropylamine and 10 ml. dimethylformamide was added gradually over a period of 1 hour and 15 minutes to the 3-azaisatoic anhydride solution in the flask. Throughout the amine addition and for 1 hour thereafter the reaction mixture was stirred, and the temperature was maintained at about 35°. Thereafter, the reaction mixture was cooled to 10°, poured into 250 ml. cold tap water and stirred for 45 minutes. The precipitate was removed from the reaction mixture by filtration, and the filtrate was salted with sodium chloride to cause precipitation of additional product, which was then removed by filtration. The first precipitate amounted to 4.0 g., melting point 165°–166°. The second precipitate amounted to 3.0 g., melting point 164.5°–165.5°. The combined yield of 7.0 g. amounted to 78.7 percent of theory. The product was identified by infrared spectroscopy and by nuclear magnetic resonance as 2-amino-N-isopropylnicotinamide.

PRODUCTION OF 3-ISOPROPYL PYRIDO[2,3-d]PYRIMIDINE-2,4(1H,3H)-DIONE

A 250 ml. 3-neck flask equipped with a stirrer, a condenser, a thermometer, a gas inlet and a gas outlet was charged with a filtered solution of 1.8 g. 2-amino-N-isopropylnicotinamide in p-dioxane, and 2.0 g. triethyl amine as an HCl acceptor. Stirring was commenced, and was continued throughout the reaction. A total of 0.98 g. phosgene was bubbled into the liquid in the flask over a period of 27 minutes. The reaction mixture was gradually heated to and thereafter maintained at reflux temperature. The following log gives reaction mixture temperatures at various times, zero time being that at which phosgene addition was commenced:

| TIME | TEMPERATURE |
|---|---|
| 0:00 | 21° |
| 0:01 | 29° |
| 0:02 | 33° |
| 0:22 | 91° |
| 0:27 | 98° |
| 0:32 | 99° |
| 4:32 | 99° |

At the end of the 4 hour and 32 minute reaction, the slurry in the flask was cooled and the p-dioxane was stripped therefrom under vacuum. A 100 ml. charge of methanol was added to the flask, and the resulting slurry was heated to 60° to dissolve the solids. The solution was then transferred to a beaker, carbon treated, and the carbon removed by filtration. Methanol was then evaporated from the filtrate. The precipitate which formed upon evaporation of methanol was identified as 3-isopropyl pyrido[2,3-d]pyrimidine-2,4(1H,3H)-dione, melting point 199°–200.5°, by infrared spectroscopy and by nuclear magnetic resonance.

I claim:

1. An N-haloquinolinimide having the formula

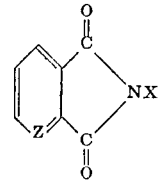

where X is chlorine or bromine.

2. N-chloroquinolinimide.